US012725962B2

(12) United States Patent
Zhao et al.

(10) Patent No.: US 12,725,962 B2
(45) Date of Patent: Sep. 1, 2026

(54) CABLE CONNECTOR WITH IMPROVED HOUSING

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Xia Zhao, Kunshan (CN); Bin Peng, Kunshan (CN); Jian-Kuang Zhu, Kunshan (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 260 days.

(21) Appl. No.: 18/601,149

(22) Filed: Mar. 11, 2024

(65) Prior Publication Data

US 2024/0313464 A1 Sep. 19, 2024

(30) Foreign Application Priority Data

Mar. 13, 2023 (CN) ......................... 202320471009.5

(51) Int. Cl.
*H01R 13/514* (2006.01)
*H01R 13/52* (2006.01)
(Continued)

(52) U.S. Cl.
CPC ....... *H01R 13/514* (2013.01); *H01R 13/5205* (2013.01); *H01R 13/6275* (2013.01); *H01R 13/6581* (2013.01)

(58) Field of Classification Search
None
See application file for complete search history.

(56) References Cited

U.S. PATENT DOCUMENTS 6,135,815 A * 10/2000 Ko ......................... H01R 13/64 439/95
6,341,986 B1 * 1/2002 Ko ..................... H01R 13/6581 439/607.41
(Continued)

FOREIGN PATENT DOCUMENTS

CN 1017848 B 8/1992
CN 1217591 A 5/1999
(Continued)

*Primary Examiner* — Tho D Ta
(74) *Attorney, Agent, or Firm* — Ming Chieh Chang

(57) ABSTRACT

A cable connector includes: a front housing including plural forwardly protruding mating tubes each having a mating cavity and plural rearwardly protruding fixing portions; a rear housing having plural receiving cavities penetrating therethrough in a front and rear direction and plural fixing grooves located next to the receiving cavities; and plural cable assemblies, wherein the cable assemblies pass through the receiving cavities and are received in the mating cavities and the receiving cavities, the fixing portions are received in the fixing grooves, and each of the fixing portions has a rear hook which extends into the receiving cavity and clasps the cable assembly to prevent the front housing from being detached from the rear housing.

20 Claims, 10 Drawing Sheets

(51) Int. Cl.
*H01R 13/627* (2006.01)
*H01R 13/6581* (2011.01)

(56) References Cited

U.S. PATENT DOCUMENTS

| | | | | |
|---|---|---|---|---|
| 10,418,742 | B1 | 9/2019 | Delphi | |
| 11,355,887 | B2 | 6/2022 | Yasuhiro et al. | |
| 2007/0224888 | A1 * | 9/2007 | Tyler | H01R 13/4365 439/752 |

FOREIGN PATENT DOCUMENTS

| | | | |
|---|---|---|---|
| CN | 103811909 | A | 5/2014 |
| CN | 107946823 | A | 4/2018 |
| CN | 218242338 | U | 1/2023 |

* cited by examiner

CABLE CONNECTOR WITH IMPROVED HOUSING

BACKGROUND OF THE INVENTION

Field of the Invention

The present invention relates generally to a cable connector, and particularly to a cable connector with improved housing to provide a good waterproof performance.

Description of Related Arts

China Patent No. CN218242338U discloses a connector which includes an insulating housing having at least one terminal channel for inserting at least one core wire and at least one core wire which includes a cable and a terminal connected with the cable. The core wire is inserted into a corresponding terminal channel from an insertion end of the insulating housing until reaching a mating end of the insulating housing. A second locking device is then detachably inserted into the insulating housing along a direction perpendicular to a bottom surface of the insulating housing. However, the second locking device cannot meet waterproof requirements.

An improved cable connector is desired.

SUMMARY OF THE INVENTION

An object of the present invention is to provide an cable connector with improved housing to provide a good waterproof performance.

To achieve the above-mentioned object, a cable connector comprises: a front housing comprising a plurality of forwardly protruding mating tubes each having a mating cavity and a plurality of rearwardly protruding fixing portions; a rear housing comprising a plurality of receiving cavities penetrating therethrough in a front and rear direction and a plurality of fixing grooves located next to the receiving cavities; and a plurality of cable assemblies, wherein the cable assemblies pass through the receiving cavities and are received in the mating cavities and the receiving cavities, the fixing portions are received in the fixing grooves, and each of the fixing portions has a rear hook which extends into the receiving cavity and clasps the cable assembly to prevent the front housing from being detached from the rear housing.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
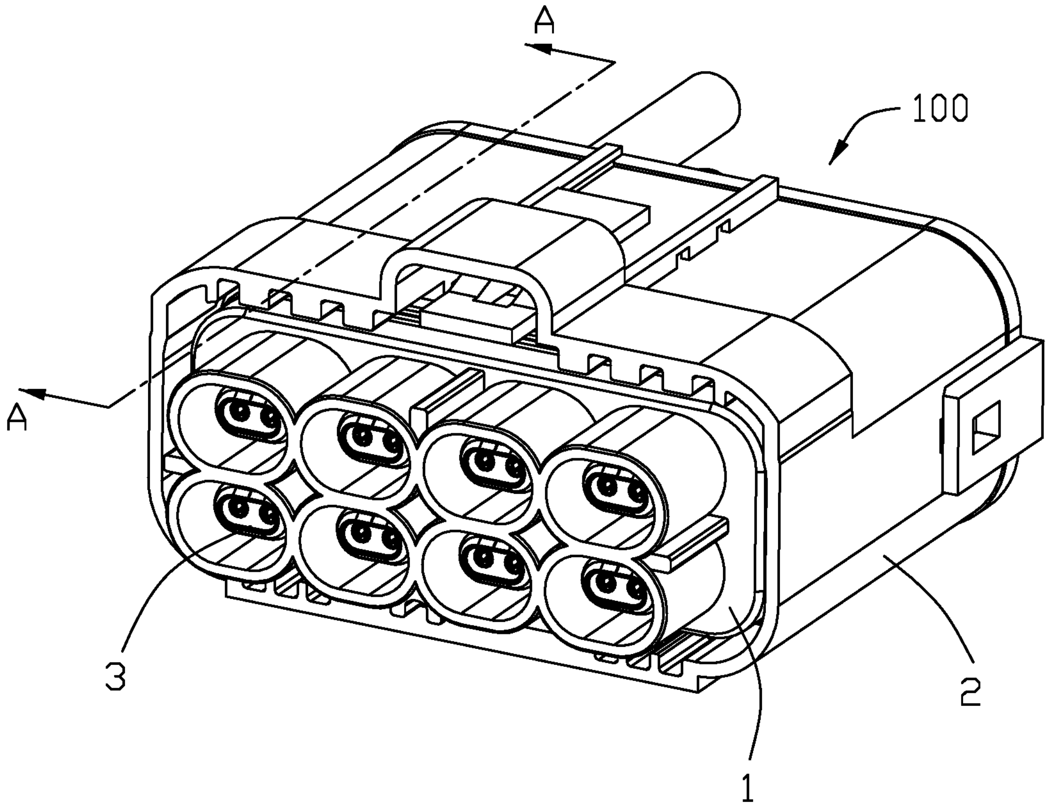
FIG. 1 is a perspective view of a cable connector of an embodiment of the present invention.
Figure 2:
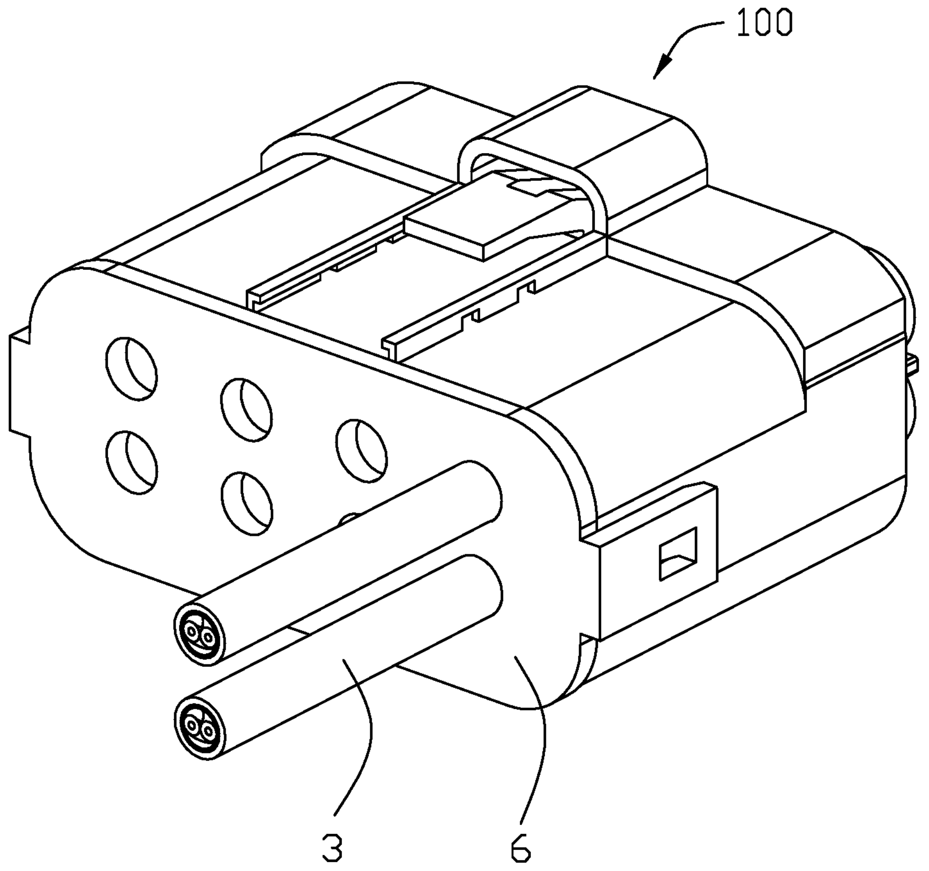
FIG. 2 is another perspective view of the cable connector of FIG. 1.

Reference will now be made to the drawing figures to describe the preferred embodiment of the present invention in detail.

Figure 6:
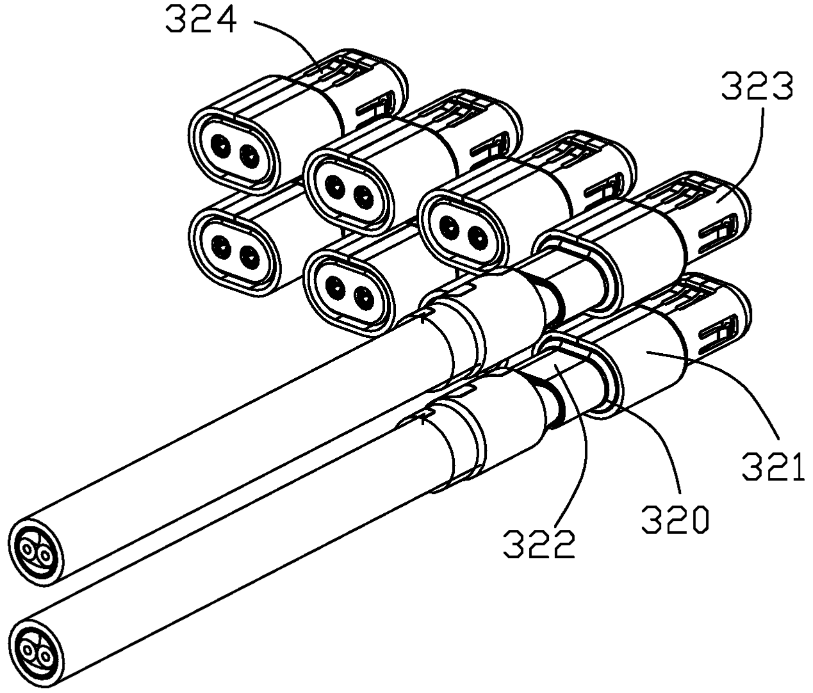
FIG. 6 is another perspective view of the cable connector of FIG. 5.
Figure 7:
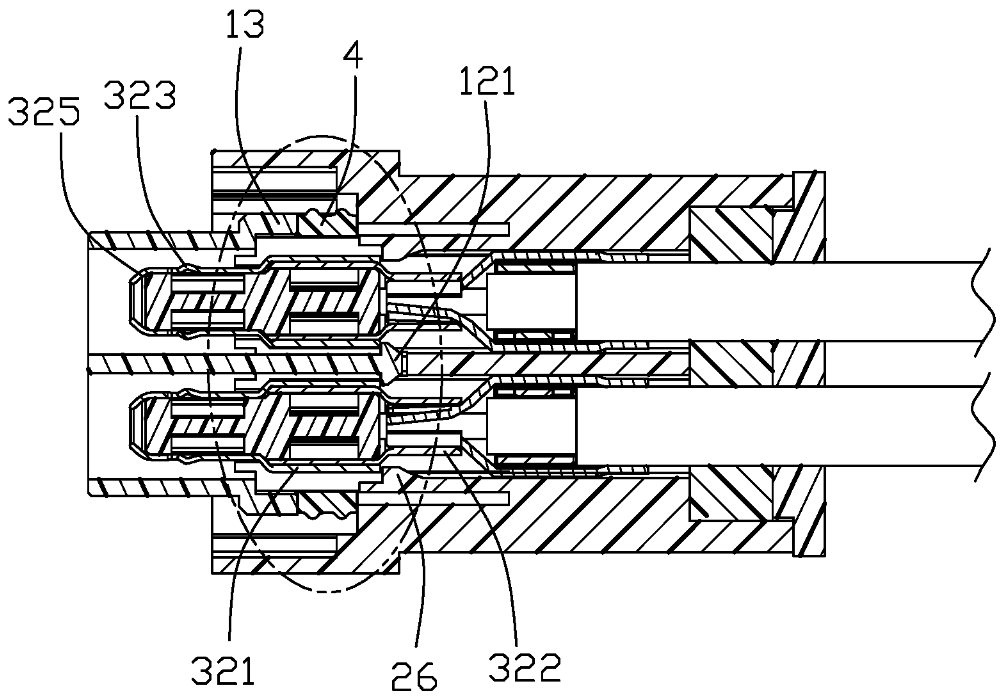
FIG. 7 is a cross-sectional view of the cable connector taken along line A-A in FIG. 1.
Figure 8:
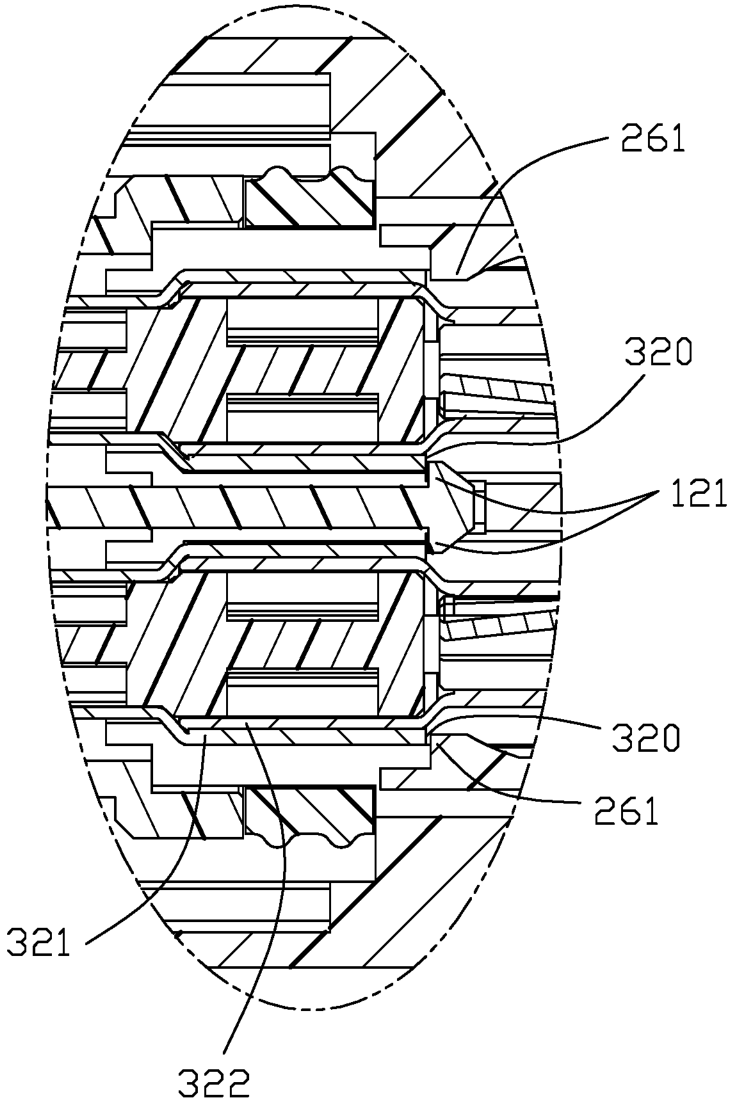
FIG. 8 is an enlarged cross-sectional view of the cable connector in a circle in FIG. 7.
Figure 9:
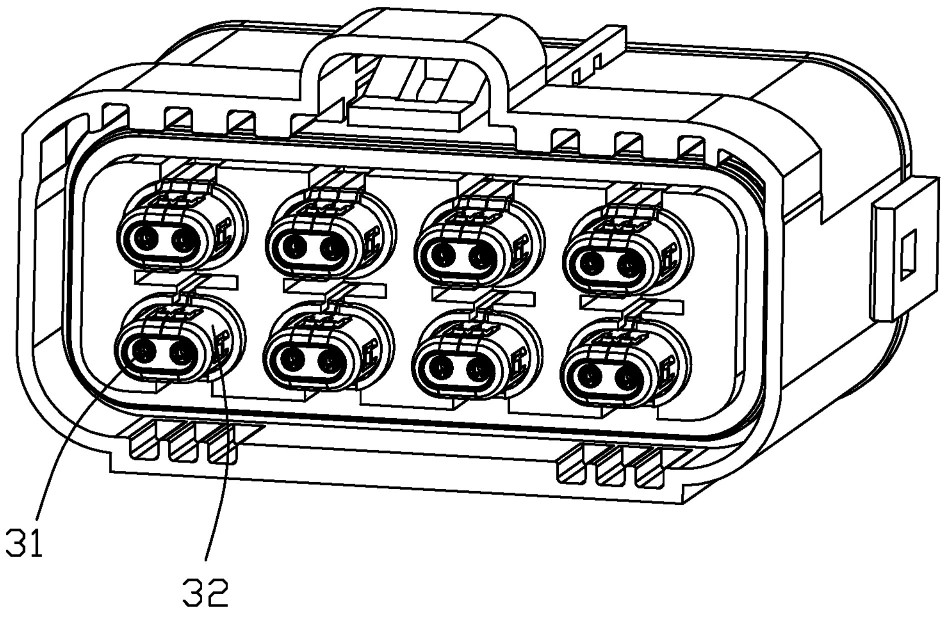
FIG. 9 is a perspective view of the cable connector removed the front housing of FIG. 1.
Figure 10:
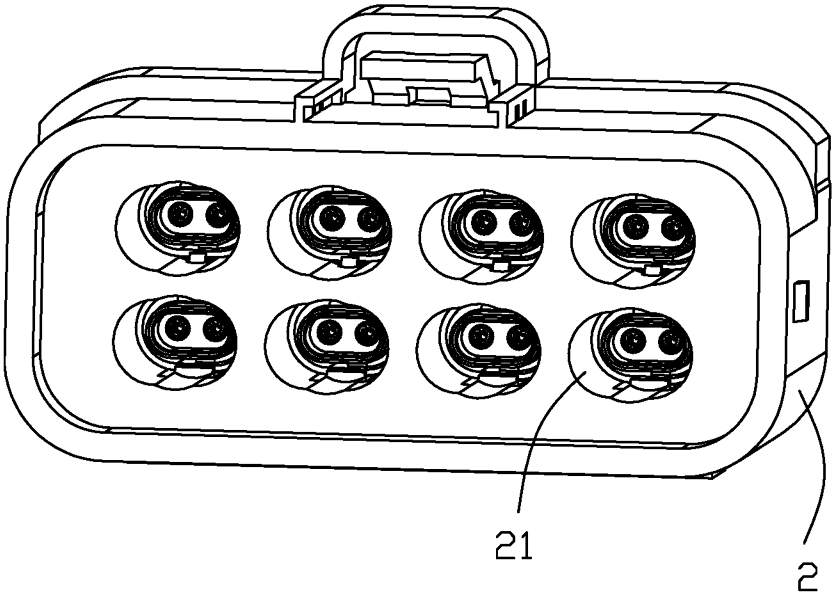
FIG. 10 is a perspective view of the cable connector removed the rear cover and the cable of FIG. 1.

Referring to FIGS. 1-10, a cable connector 100 of the present invention is a type of car ethernet connector. The cable connector 100 comprises a front housing 1, a rear housing 2, and a plurality of cable assemblies 3. The front housing 1 comprises an upright base portion 10, a plurality of mating tubes 11 protruding forward from the upright base portion 10, and at least one fixing portion 12 protruding rearward from the upright base portion 10. An end of the fixing portion 12 has a rear hook 121. The rear housing 2 comprises a plurality of receiving cavities 21 opening therethrough in a front and rear direction and a plurality of fixing grooves 22 located next to the receiving cavities 21. The mating tube 11 has a mating cavity 111. The cable assembly 3 passes through the receiving cavity 21 and then is received in the mating cavity 111 and the receiving cavity 21. The fixing portion 12 is received in the fixing groove 22. The rear hook 121, as shown in FIG. 8, extends into the receiving cavity 21 and clasps the cable assembly 3 forwards to prevent the front housing 1 from being detached from the rear housing 2.

Figure 5:
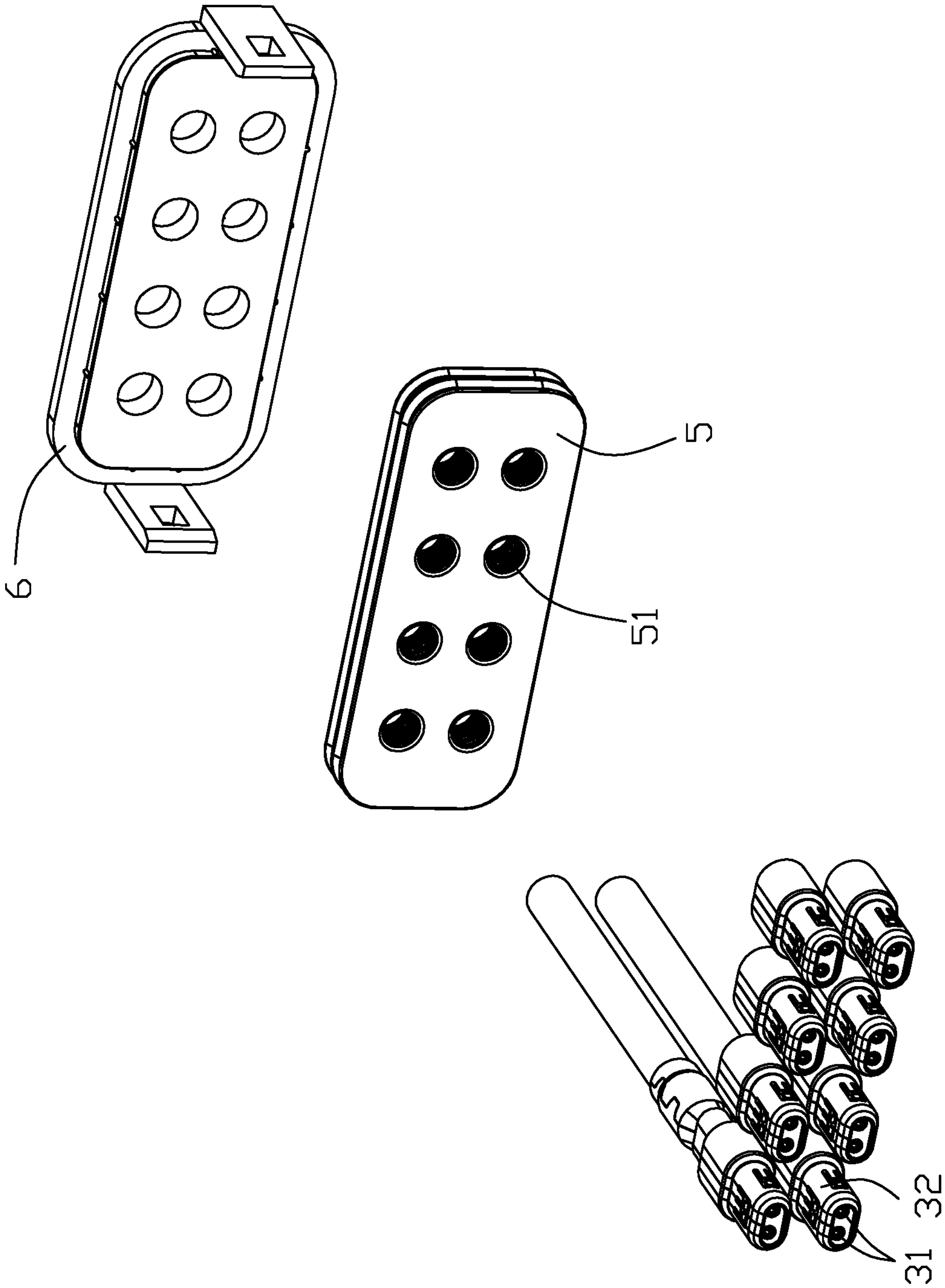
FIG. 5 is an exploded perspective view of the cable assembly, the rubber pad and the rear cover of the cable connector of FIG. 1.

Referring to FIGS. 5-6, each of the cable assembly 3 comprises two terminals 31 arranged along a first direction and a shielding tube 32 surrounding the terminals 31. The shielding tube 32 has a rear surface 320, the rear hook 121 clasps on the rear surface 320. As shown in FIGS. 6-8, the shielding tube 32 includes an inner shell 322 and an outer shell 321 covering a front end of the inner shell 322. The outer shell 321 extends forward to form a mating portion 323 located in the mating cavity 111. The mating portion 323 has a plurality of elastic contact arms 324. The elastic contact arms 324 are arranged around the pair of terminals 31. Each elastic contact arm 324 has a contact portion 325 protruding outwardly.

Figure 4:
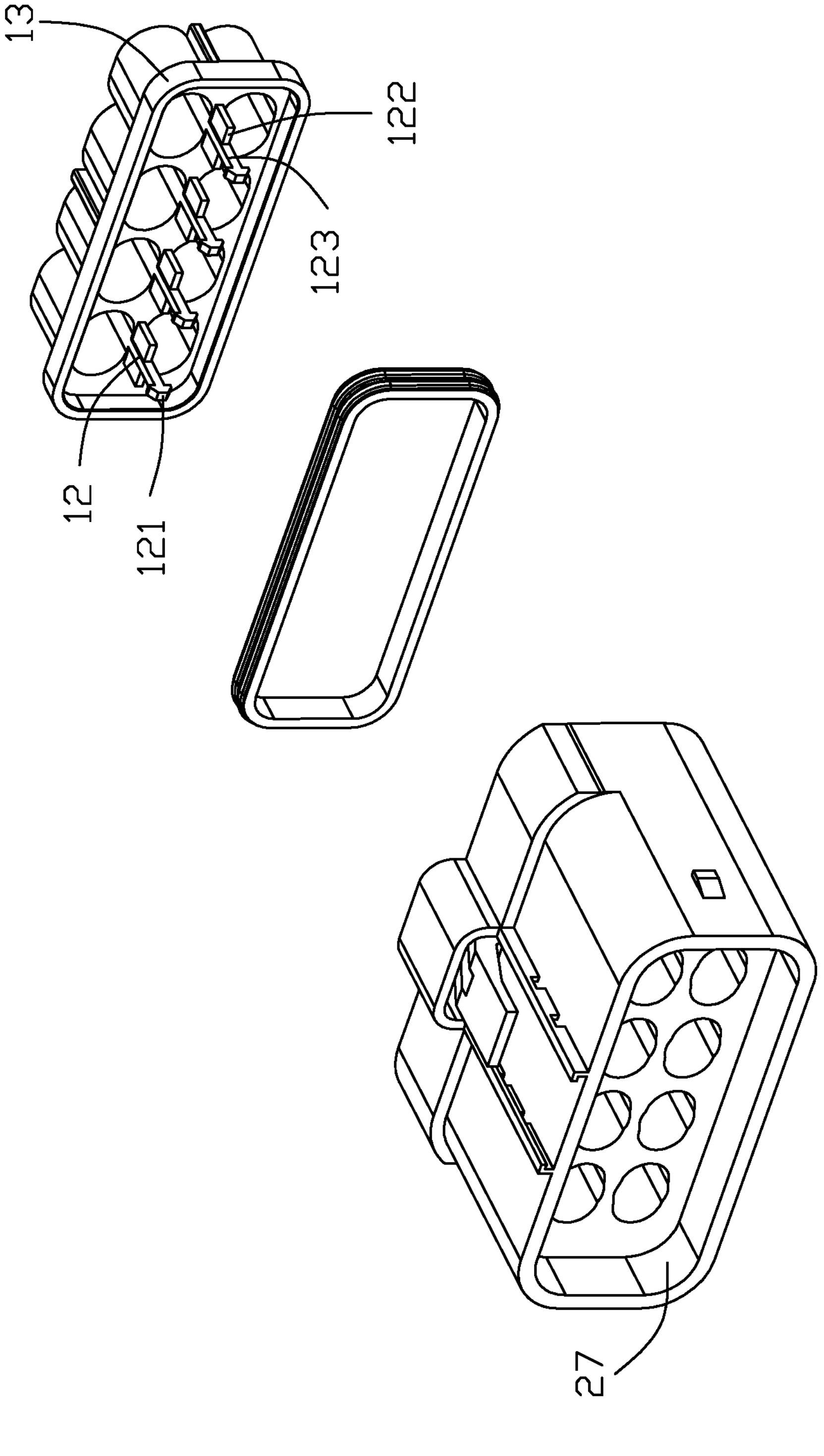
FIG. 4 is another perspective view of the cable connector of FIG. 3.

Referring to FIG. 4, the fixing portion 12 comprises a flat plate portion 122 extending along the first direction and a latching arm 123 located in a middle of the flat plate portion 122 and extending rearward. The rear hook 121 is located at an end of the latching arm 123 and extends along a second direction perpendicular to the first direction.

Figure 3:
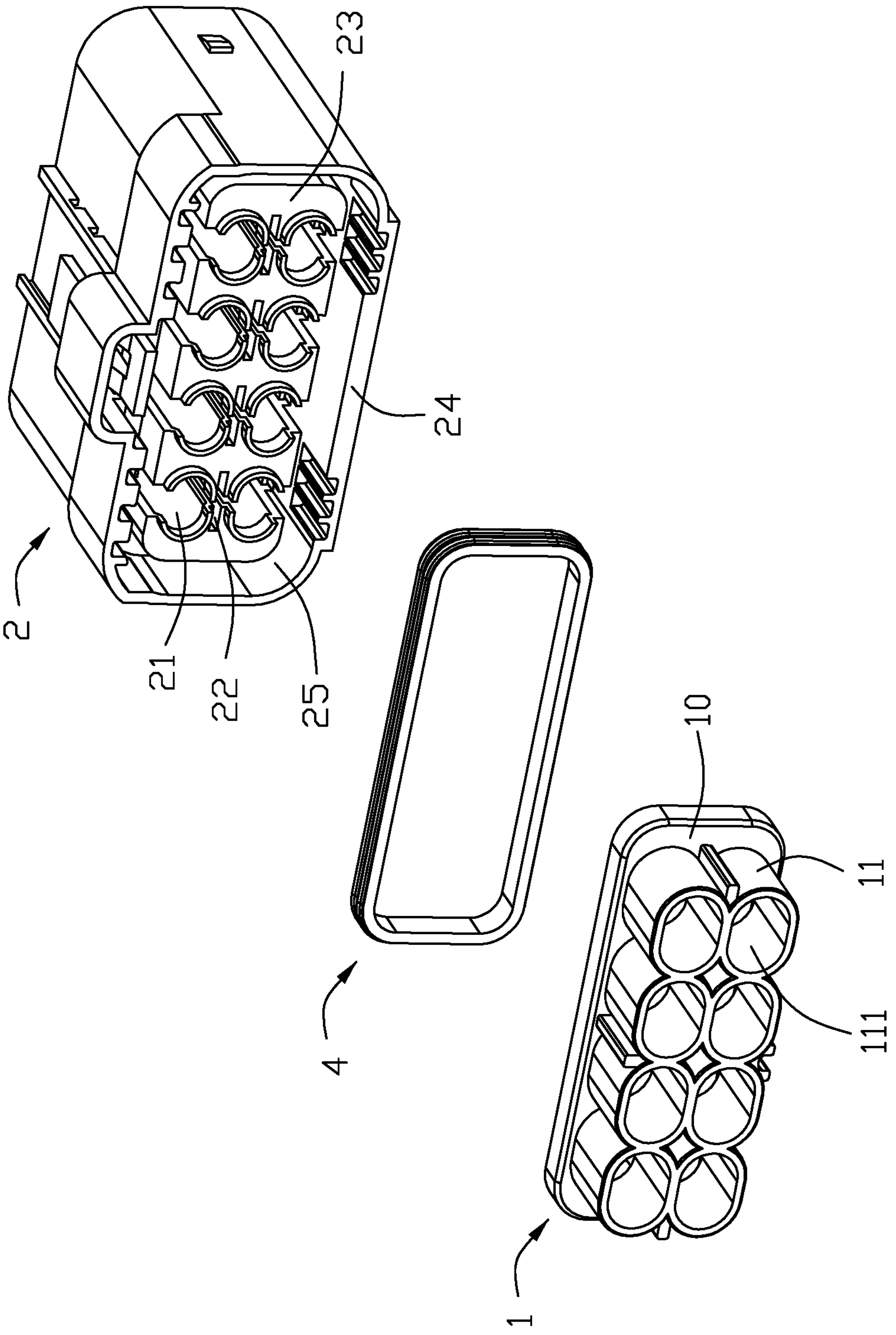
FIG. 3 is an exploded perspective view of the front housing, the rear housing and the rubber ring of the cable connector of FIG. 1.

Referring to FIGS. 3-4, the front housing 1 and the rear housing 2 comprise at least two mating cavities 111 and receiving cavities 21. The two receiving cavities 21 are arranged along the second direction. The fixing portion 12 has two rear hooks 121 located at the end of the latching arm 123. The two rear hooks 121 protrude into corresponding receiving cavities 21 respectively and each clasp a corresponding cable assembly 3. As shown in FIG. 3, in this embodiment, the front housing 1 has eight mating cavities 111 in 2*2 array pattern, and the rear housing 2 has eight receiving cavities 21. The two rear hooks 121 on the same fixing portion 12 are respectively located above and below the end of the latching arm 123.

Referring to FIGS. 1-4, the front housing 1 is installed to the rear housing 2 from the front to the back firstly, the cable assemblies 3 are assembled on the rear housing 2 from the back to the front secondly. The cable assemblies 3 pass forwardly over the rear hooks 121, the rear hooks 121 abut forward against the cable assemblies 3. The rear housing 2 has an island portion 23 protruding forward and an outer annular wall 24 surrounding the island portion 23. A ring groove 25 is defined between the island portion 23 and the outer annular wall 24. The receiving cavities 21 are located in the island portion 23. The front housing 1 has a rear annular wall 13 extending backward to fit into the ring groove 25.

The cable connector 100 comprises a rubber ring 4. The rubber ring 4 is disposed in the ring groove 25. Specifically, the rubber ring 4 is set on the outer periphery of the island portion 23. As shown in FIG. 7, the rear annular wall 13 of the front housing 1 presses the rubber ring 4. The deformation caused by the rubber ring 4 being squeezed in the front and rear direction allows the rear hook 121 of the front housing 1 to elastically hold on the rear surface 320 of the outer shell 321. That is, the rebound force generated by the extrusion of the rubber ring 4 ensures that the front housing 1 can be stably held on the rear surface 320 in the front and rear direction.

Referring to FIGS. 7-8, the rear housing 2 comprises a cantilever 26. A free end of the cantilever 26 has a resisting portion 261 extending into the receiving cavity 21 along the second direction. The resisting portion 261 resists the rear surface 320 of the outer shell 321 forward. The rear hook 121 and the cantilever 26 in the same receiving cavity 21 are arranged opposite to each other in the second direction. The rear housing 2 comprises a mounting groove 27 penetrating rearward. A rubber pad 5 comprising a plurality of through holes 51 for passing through the cable assemblies 3 are received in the mounting groove 27. The cable connector 100 has a rear cover 6 fixed to a rear end of the rear housing 2 and covering the mounting groove 27.

The above-mentioned embodiments are only preferred embodiments of the present invention, and should not limit the scope of the present invention, any simple equivalent changes and modifications made according to the claims of the present invention and the contents of the description should still belong to the present invention.

The invention claimed is:

1. A cable connector comprising:

a front housing comprising a plurality of forwardly protruding mating tubes each having a mating cavity and a plurality of rearwardly protruding fixing portions;

a rear housing comprising a plurality of receiving cavities penetrating therethrough in a front and rear direction and a plurality of fixing grooves located next to the receiving cavities; and a plurality of cable assemblies;

wherein the cable assemblies pass through the receiving cavities and are received in the mating cavities and the receiving cavities, the fixing portions are received in the fixing grooves, and each of the fixing portions has a rear hook which extends into the receiving cavity and clasps the cable assembly to prevent the front housing from being detached from the rear housing.

2. The cable connector as claimed in claim 1, wherein each of the cable assemblies comprises two terminals arranged along a first direction and a shielding tube surrounding the two terminals, the shielding tube has a rear surface, and the rear hook clasps on the rear surface.

3. The cable connector as claimed in claim 2, wherein the fixing portion comprises a flat plate portion extending along the first direction and a latching arm located in a middle of the flat plate portion and extending rearward, and the rear hook is located at an end of the latching arm and extends along a second direction perpendicular to the first direction.

4. The cable connector as claimed in claim 3, wherein the mating cavities are arranged in two rows along the second direction, the fixing portion has two rear hooks located at the end of the latching arm, the two rear hooks protrude into corresponding receiving cavities and clasp corresponding cable assemblies.

5. The cable connector as claimed in claim 4, wherein the two rear hooks of the fixing portion are respectively located above and below the end of the latching arm.

6. The cable connector as claimed in claim 1, wherein the front housing is installed rearwardly to the rear housing firstly, the cable assemblies are then assembled forwardly to the rear housing secondly by passing forwardly over the rear hooks which in turn abut forwardly against the cable assemblies.

7. The cable connector as claimed in claim 1, wherein the rear housing has an island portion protruding forwardly and an outer annular wall surrounding the island portion, a ring groove is defined between the island portion and the outer annular wall, the receiving cavities are located in the island portion, and the front housing has a rear annular wall extending backward to fit into the ring groove.

8. The cable connector as claimed in claim 7, further comprising a rubber ring disposed in the ring groove, and wherein the rear annular wall of the front housing presses the rubber ring.

9. The cable connector as claimed in claim 1, wherein the rear housing comprises a cantilever extending into the receiving cavity, a free end of the cantilever having a resisting portion extending into the receiving cavity to forwardly clasp a corresponding cable assembly.

10. The cable connector as claimed in claim 1, further comprising a rubber pad and a rear cover, and wherein the rear housing comprises a mounting groove penetrating rearwards, the rubber pad has a through hole for the cable assembly to pass through and is received in the mounting groove, and the rear cover is fixed to a rear end of the rear housing and covers the mounting groove.

11. The cable connector as claimed in claim 2, wherein the shielding tube extends forward to form a mating portion located in the mating tube, and the mating portion has a plurality of elastic contact arms.

12. A cable connector comprising:

a front housing having an upright base portion, a plurality of mating tubes protruding forwards from the upright base portion, and at least one fixing portion protruding rearwards from the upright base portion;

a rear housing having a plurality of receiving cavities penetrating therethrough in a front-rear direction and at least one fixing groove; and a plurality of cable assemblies;

wherein the front housing and the rear housing are assembled together by the fixing portion entering the fixing groove firstly and then the cable assemblies being assembled into the mating tubes and the receiving cavities until a rear hook of the fixing portion passes across and then presses forwards against a corresponding cable assembly.

13. The cable connector as claimed in claim 12, wherein each of the cable assemblies comprises two terminals arranged along a first direction, a shielding tube surrounding the terminals, and cables connecting with the terminals, and the fixing portion presses against a rear face of the shielding tube.

14. The cable connector as claimed in claim 13, wherein the fixing portion comprises a latching arm extending forwards, two flat plate portions extending from two opposite sides of the latching arm in the first direction, and two rear hooks arranged in a second direction perpendicular to the first direction.

15. A cable connector comprising:

a front housing comprising two mating tubes extending forwards and a fixing portion extending rearwards and located between the two mating tubes;

a rear housing having a fixing groove, the fixing portion being inserted into and retained in the fixing groove; and two cable assemblies retained in the front housing and the rear housing and extending into the mating tubes;

wherein the fixing portion has a latching arm and two rear hooks, and the two rear hooks press against the two cable assembles respectively.

16. The cable connector as claimed in claim 15, wherein each of the cable assemblies comprises two terminals arranged horizontally, a shielding tube surrounding the terminals, and cables connecting with the terminals, the two cable assembles are arranged uprightly, and the rear hooks press against rear faces of the shielding tubes of the two cable assemblies.

17. The cable connector as claimed in claim 16, wherein the fixing portion comprises two flat plate portions extending horizontally from the latching arm, the flat plate portions are horizontally inserted and retained into corresponding grooves defined on the rear housing.

18. The cable connector as claimed in claim 17, comprising a rubber ring, wherein the front housing comprises an upright base portion from which the mating tube extends forwards and the fixing portion extends rearwards, and the rubber ring is sandwiched between a peripheral face of the upright base portion and the rear housing.

19. The cable connector as claimed in claim 15, comprising a rubber pad attached on a rear face of the rear housing.

20. The cable connector as claimed in claim 19, comprising a rear cover fixed to and covers the rear face of the rear housing.

* * * * *